(12) United States Patent
Kneer

(10) Patent No.: US 8,485,398 B2
(45) Date of Patent: Jul. 16, 2013

(54) ONE-WAY VALVE

(75) Inventor: Roland Kneer, Farchant (DE)

(73) Assignee: GAPLAST GmbH, Altenau (DE)

( * ) Notice: Subject to any disclaimer, the term of this patent is extended or adjusted under 35 U.S.C. 154(b) by 270 days.

(21) Appl. No.: 12/899,329

(22) Filed: Oct. 6, 2010

(65) Prior Publication Data

US 2011/0079300 A1    Apr. 7, 2011

(30) Foreign Application Priority Data

Oct. 7, 2009   (DE) .......................... 10 2009 048 476

(51) Int. Cl.
| | | |
|---|---|---|
| B65D 5/72 | (2006.01) | |
| B65D 25/40 | (2006.01) | |
| B65D 35/38 | (2006.01) | |
| B65D 37/00 | (2006.01) | |
| F16K 15/14 | (2006.01) | |

(52) U.S. Cl.
USPC ........... 222/494; 222/490; 222/496; 222/213; 137/852; 137/859

(58) Field of Classification Search
USPC .......... 222/494–496, 212, 213, 491; 137/859, 137/852, 843; 251/331, 354
See application file for complete search history.

(56) References Cited

U.S. PATENT DOCUMENTS

| | | | |
|---|---|---|---|
| 3,010,619 A | 11/1961 | Gronemeyer et al. | |
| 3,556,122 A * | 1/1971 | Laerdal ....................... 137/102 |
| 3,754,690 A * | 8/1973 | Marchant ..................... 222/494 |
| 4,420,101 A * | 12/1983 | O'Neill ........................ 222/212 |
| 4,739,906 A * | 4/1988 | LoTurco ....................... 222/212 |
| 5,025,957 A * | 6/1991 | Ranalletta et al. ....... 222/189.09 |
| 5,358,376 A * | 10/1994 | van den Top ................. 414/412 |
| 5,573,516 A * | 11/1996 | Tyner ............................ 604/249 |
| 6,089,272 A * | 7/2000 | Brand et al. .................. 137/859 |
| 6,953,027 B2 * | 10/2005 | Veinotte ....................... 123/520 |
| 7,249,694 B2 * | 7/2007 | Masuda ....................... 222/212 |
| 7,303,098 B2 * | 12/2007 | Backes ......................... 222/212 |
| 7,306,129 B2 * | 12/2007 | Swiss et al. .................. 222/494 |
| 7,699,193 B2 * | 4/2010 | Feierabend .................. 222/494 |
| 2009/0302073 A1 * | 12/2009 | McKeown ................... 222/571 |

FOREIGN PATENT DOCUMENTS

| | | |
|---|---|---|
| GB | 2260535 | 4/1993 |
| WO | 2008015505 | 2/2008 |

\* cited by examiner

*Primary Examiner* — Paul R Durand
*Assistant Examiner* — Matthew Lembo
(74) *Attorney, Agent, or Firm* — Greer, Burns & Crain, Ltd.

(57) ABSTRACT

The one-way valve for discharging a liquid out of a container, comprising an outer cap which is fastened to the container neck and comprises an exit channel for the liquid is characterized in that a valve body of elastic material is arranged between the container and the outer cap, that the valve body extends over the opening of the container neck and comprises a projection which projects into the exit channel of the outer cap and is arranged therein to be movable back and forth, that a space remains between the inner wall of the exit channel and the outer circumference of the projection, and that at least one cut severs the wall of the valve body, through which cut liquid passes into the space of the exit channel upon exertion of pressure on the container.

12 Claims, 4 Drawing Sheets

ONE-WAY VALVE

FIELD

The present invention relates to a one-way valve for discharging a liquid out of a container, the valve comprising an outer cap which is fastened to the container neck and comprises an exit channel for the liquid.

BACKGROUND

Numerous one-way valves for discharging a liquid out of a container are known. For instance, EP 1 499 538 B1 discloses a one-way valve in which a valve seat is inserted into the container neck covered by a valve body of elastic material. Upon exertion of pressure on the container the contents of the container flows between a projection of the valve seat and the valve body through an exit opening of an outer cap covering said one-way valve.

SUMMARY OF THE INVENTION

It is the object of the present invention to provide a one-way valve of a simple design that can be produced at low costs. The one-way valve should particularly be suited for discharging small amounts of a container liquid, as is e.g. the case with eye drops, without the invention being limited thereto.

This object is achieved according to the invention by a one-way valve for discharging a liquid out of a container having a neck, comprising an outer cap which is fastened to the container neck and comprises an exit channel for the liquid. A valve body of elastic material is arranged between the container and the outer cap. The valve body extends over the opening of the container neck and comprises a projection which projects into the exit channel of the outer cap and is arranged therein to be movable back and forth. A space remains between the inner wall of the exit channel and the outer circumference of the projection. At least one cut severs the wall of the valve body, through which cut liquid passes into the space of the exit channel upon exertion of pressure on the container.

Advantageous developments of the invention are indicated below.

According to the invention a valve body of an elastically deformable material, such as LLDPE, PUR, silicone, without this list being complete in any way, is arranged between the container and the outer cap, the valve body extends over the opening, preferably over the whole opening, of the container neck and comprises a preferably central projection which projects into the exit channel of the outer cap and is arranged therein to be movable back and forth with respect to the longitudinal axis thereof, furthermore a space remains between the inner wall of the exit channel and the outer circumference of the projection, and at least one cut or slit severs the wall of the valve body, through which cut or slit liquid passes into the above-mentioned space of the exit channel upon exertion of pressure on the container and exits out of the opening thereof. Upon exertion of pressure on the container or the contents of the container, the at least one cut opens so that the liquid can pass through the cut and thus through the valve body, and in the pressureless state the cut closes again due to the elasticity of the material of which the valve body is made. This principle is also suited for the discharge of a viscous or creamy substance; the length of the cut, which preferably extends along a circular arc section, must here be adapted to the amount of liquid to be discharged and to the consistency of the container contents to be discharged.

In a preferred embodiment of the invention the at least one cut through the wall of the valve body is preferably made without removing or cutting away a strip of the valve body—although this is also within the scope of the invention; in this case the "cut" can then not close entirely in the pressureless state. It is however preferred that the cut is made by a knife, without wall material being cut away, the knife being preferably shaped like a wedge when viewed in cross section. This can e.g. be done under the action of heat in such a manner that a small wedge-shaped entry gap remains for the liquid whereas on the exit side the wall material is abutting in the pressureless state. In principle, the cut can e.g. also be made by a laser.

The valve body can e.g. be clipped into an annular groove, which is radially spaced apart from the exit channel, in the underside of the outer cap. It is however preferred that the valve body rests with its edge section on the edge of the container neck and is firmly clamped by the outer cap clipped or screwed onto the container neck, so that the outer cap is sealed by the valve body relative to the container neck. This has the advantage that no special seal is needed, so that the one-way valve consists only of two components, namely the outer cap and the valve body. The one-way valve is of a particularly simple design and can be produced at low costs.

Furthermore, it is provided with advantage that the projection of the valve body, which preferably has a substantially conically tapering pin shape, is equipped on the upper end portion with a surrounding sealing lip which in the pressureless initial state of the valve body tightly rests on a wall section of the exit channel. The exit channel of the outer cap tapers preferably slightly conically up to the sealing lip of the valve body, where a conically widening shoulder of the exit channel may be positioned on which the correspondingly shaped sealing lip tightly rests in the pressureless initial state. The subsequent end portion of the exit channel can widen slightly conically towards the exit opening so as to release a small annular gap for the discharge of container liquid between the wall of the exit portion and the outer circumference of the sealing lip upon the advance movement of the projection into the exit channel.

The valve body recedes in the initial state from the upper edge of the outer cap, which offers the advantage that after discharge of container liquid in the pressureless state a drop which has remained on the exit opening of the exit channel is sucked into the end portion of the exit channel by the valve body returning into the initial position. This prevents contamination of the outer cap by remaining liquid.

According to a further suggestion of the invention a stop defines the advance movement of the projection towards the opening of the exit channel. This is accomplished in an advantageous development of the invention in that an annular shoulder section which is spaced apart from and opposite to the rear edge portion of the exit channel of the outer cap in the pressureless initial state of the valve body protrudes from the outer circumference of the projection. This stop prevents the discharge of container liquid at an undesired high pressure and/or in an undesired large quantity because the projection is pressed in such a case against the stop of the exit channel and interrupts the flow of the liquid to the exit opening of the outer cap. With suitable dimensions it is possible with the help of the stop that only one drop of the liquid is discharged at a time. This can be particularly desirable when a one-way valve is used in an eye-dropper.

The projection of the valve body is preferably made hollow and is here open towards the interior of the container whereas the projection on the side of the exit opening is of course closed.

The above-described one-way valve is particularly suited for so-called airless containers in which a soft inner pouch is arranged in an outer container, said inner pouch contracting upon discharge of container liquid without ambient air entering into the inner pouch for pressure compensation. Rather, this ambient air passes through suitable holes in the outer container into the space between the soft inner pouch and the outer container. In such an airless system no preservatives are needed for the contents of the container.

The one-way valve according to the invention is however also applicable in an atmospherically vented simple container into which ambient air enters after discharge of container liquid for pressure compensation. To this end it is suggested that the outer cap should comprise at least one outer vent hole, and that the valve body should comprise at least one further cut through its wall, through which cut the air entering through the outer vent hole can enter into the interior of the container. To this end it is provided in an advantageous configuration that the outer vent hole leads into an annular vent channel that is open towards the inside of the outer cap, with the at least one further cut being made at a place conforming to the vent channel. This at least one further cut is advantageously positioned radially outside of the at least one other cut through which the container liquid exits.

While no air passes in the opposite direction through the cut or slit through which the liquid passes, for the reason that without any exertion of pressure on the contents of the container the cut or slit is closed completely tightly, only air can enter from the outside into the interior of the container through the radially outer other cut or slit, but no container liquid can exit. These one-way cuts can be formed in that the radially inner cut is made from the inside to the outside, i.e. starting from the container inside, with a knife preferably having a wedge-shaped cross-section, whereas the radially outer cut is made in opposite direction, i.e. from the outside to the inside. It must be assumed that a very small gap that closes in wedge-shaped configuration and into which the medium enters and opens the cut or slit—by way of overpressure or negative pressure—is left due to the wedge shape of the knife at the entry side of the liquid or the air, respectively.

The cuts can extend through a flat portion of the valve body. It is however preferred that the radially inner cut is made in a curvature that is convex relative to the interior of the container, the cut being particularly preferably made on the uppermost portion thereof, while the air passage cut should be made at an inversely curved place, i.e. on a curvature that is concave relative to the container interior. The overpressure acting on the contents of the container has the effect that the cut or slit opens into the convexly curved portion while the slit on the indentation (viewed from the interior of the container) is firmly pressed together. When after discharge of liquid the user no longer exerts any pressure on the container, the negative pressure in the container has the effect that the outer cut opens whereas the radially inner cut is compressed by the negative pressure and does not permit the passage of air.

The radially inner slit also opens due to the deformation of the valve body in this area when the attachment is pushed forwards into the exit channel. That is why the slit can also be formed on an indentation that is concave relative to the container.

The cuts can be made not only vertically through the wall of the valve body, but also obliquely.

According to a further suggestion of the invention an air filter can be arranged in the outer cap; the air entering into the interior of the container is here passing through the filter. If, as is preferred, the outer vent hole leads into an annular vent channel, the filter is expediently arranged in said channel.

It is further suggested that the valve body between the at least one radially inner cut or slit and the at least one radially outer cut or slit should comprise an annular projection or an annular groove that is in sealing engagement with a corresponding groove or a corresponding projection of the outer cap. Hence, the area of the valve in which the liquid is discharged is tightly separated from the area from which air can flow into the interior of the container for pressure compensation. This ensures that no liquid can flow between the valve body and the outer cap into the portion reserved for air and can contaminate a filter that might be arranged there.

As has already been mentioned above, the one-way valve according to the invention is virtually made of only one outer cap, which may for instance be made from pharmaceutically approved PP or polyolefin, and of the valve body, except for the possibly arranged filter. The invention can be employed such that the same outer cap and the same valve body are used for three different types of liquid dosing devices, such as eye-droppers; in the valve body the at least one outer cut is omitted in the case of an airless system. Of course, instead of the airless system, it is possible to use an outer cap without vent hole and possibly annular vent channel.

BRIEF DESCRIPTION OF THE DRAWINGS

Further details of the invention become apparent from the following description of preferred embodiments of a one-way valve and with reference to the drawing, in which.

DESCRIPTION OF THE PREFERRED EMBODIMENTS

Figure 1:
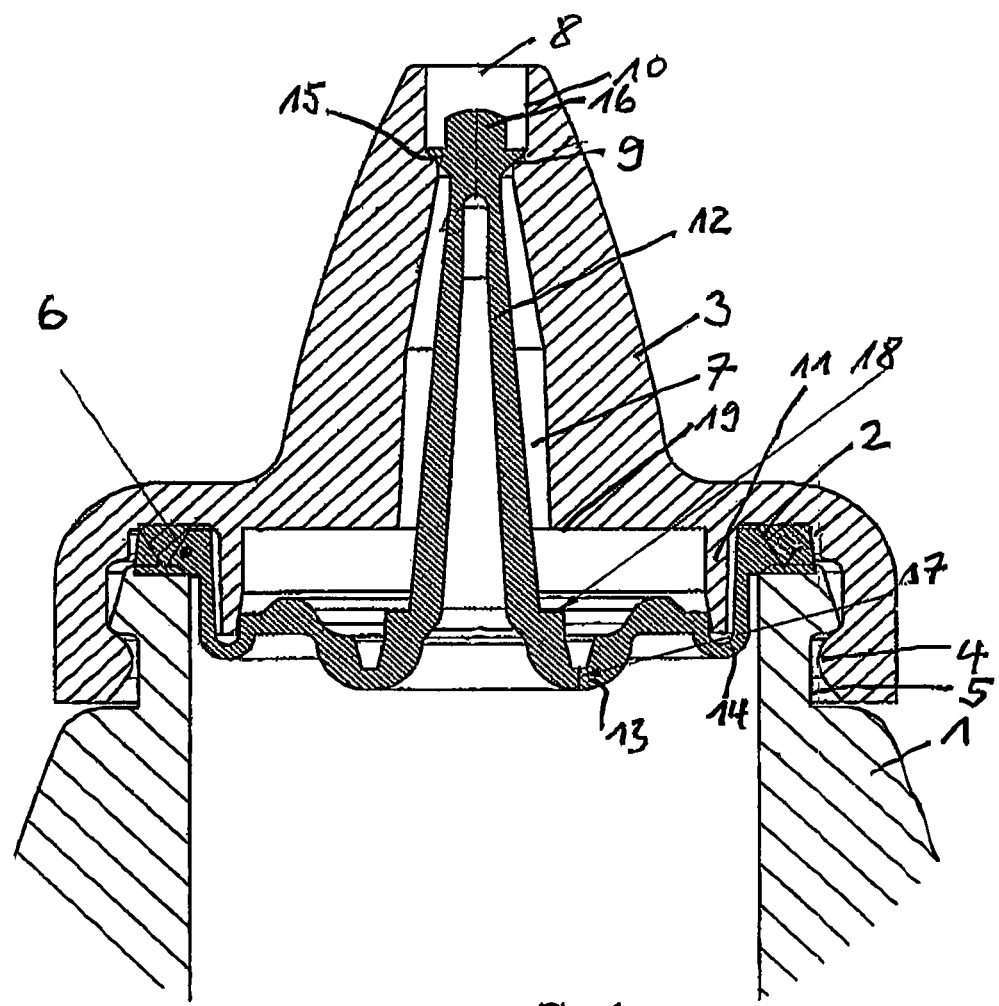
FIGS. 1 to 3 show a first embodiment in three different states.
Figure 2:
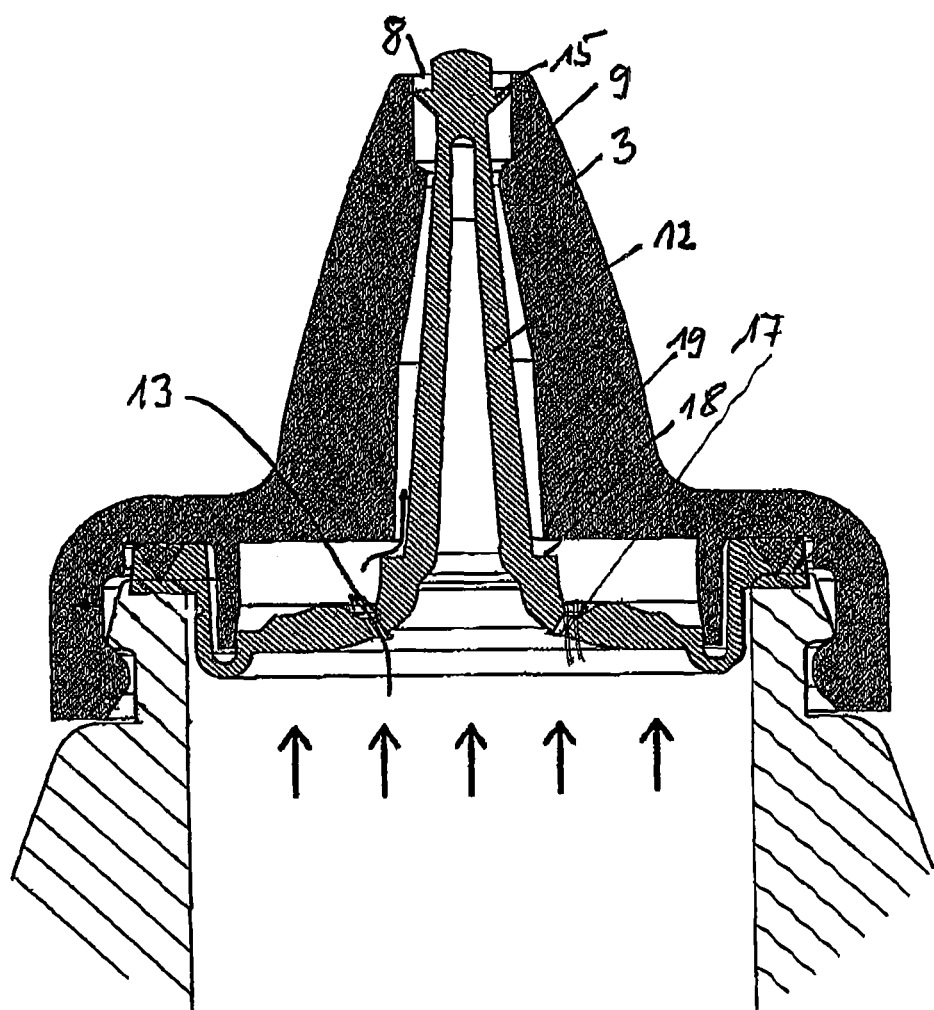
Figure 3:
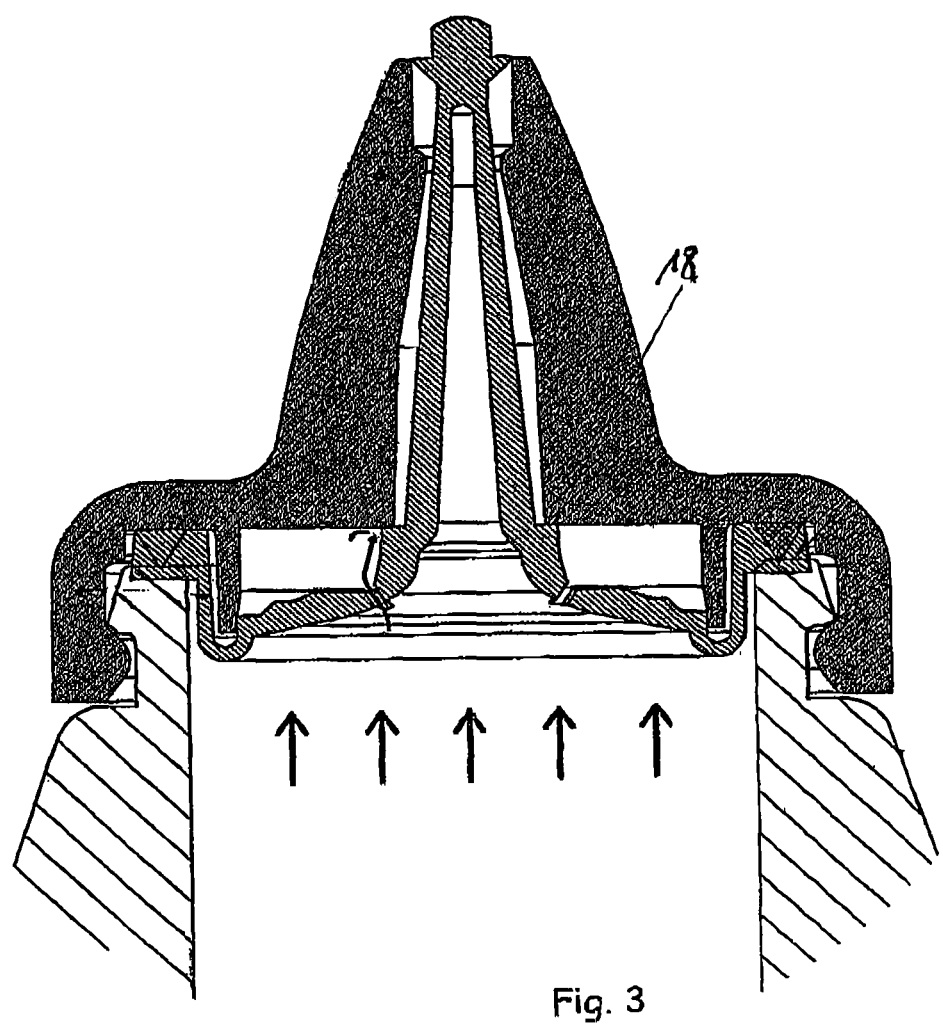

FIGS. 1 to 3 show a one-way valve for a container of an airless system, in which after discharge of liquid from the container no air exits through the valve for pressure compensation.

A surrounding thickened bead-like edge of a valve body 6 is arranged on the upper edge of a container neck 1. An outer cap 3 of a rigid plastic material is clipped onto the container neck 1, with an inwardly projecting bulge 4 on the edge of the outer cap 3 being locked into a surrounding groove 5 of the container neck 1. Here, the outer cap 3 presses the bead-like edge 2 of the valve body 6 as a seal firmly against the container neck 1.

The outer cap 3 contains a central outlet bore 7, which is circular in cross section and is tapered upwards, i.e. towards the opening 8, first conically, wherein in the upper end portion a wall section 9 is configured as a conically widening shoulder 9 which is followed by an enlarged end portion 10, which also widens upwardly in slightly conical fashion.

A ring-like web 11 projects downwards from the bottom side of the outer cap 3, the web 11 engaging at a radial distance into the container neck 1 and covering the bead-like edge 2 of the valve body 6. The valve body 6 contains a central projection 12 which projects almost up to the exit opening 8 into the exit channel 7 of the outer cap 3 and integrally passes via cross-sectionally curved sections 13 and 14 into the bead-like edge 2. The projection 12 is made hollow almost up to an upper, outwardly projecting sealing lip 15. A short compact head section 16 of the valve 6, which in the pressureless initial state of the container as shown in FIG. 1 is retracted from the plane of the exit opening 8, is positioned above the sealing lip 15.

The valve body 6 has a circular layout, i.e. the bulges 13 and 14 have a concave annular shape when viewed from the container. At the lowermost place of the bulge 13 in the figures there is a circumferentially short cut 17 through the wall of the valve body 6, said cut 17 only extending over a short circular-arc section. The cut is probably a few millimeters long in the case of a small eye-drop bottle of a standard size.

The projection 12 of the valve body 6 comprises a horizontally outwardly projecting annular sealing surface 18 that is opposite to and spaced-apart from a wall section 19 on the edge of the exit channel 7 of the outer cap 4 in the initial state shown in FIG. 1. In this state the upper sealing lip 15 tightly rests on the conical shoulder 9 of the outer cap 3.

FIG. 2 shows a state in which a pressure P1 is exerted on the contents of the container to discharge liquid out of the container. Moreover, the illustration of FIG. 2 differs from that of FIG. 1 in that two diametrically opposite cuts or slits 17 sever the valve body 6 over a short length.

Due to the exertion of pressure P1 the projection 12 of the valve body 6 is further pressed into the outer cap 3, so that the upper end section of the valve body 6 lifts from the conical shoulder 9 and releases the exit opening 8 for the discharge of liquid. The elastic deformation of the valve body 6 during the advance movement into the outer cap 3 helps, together with the pressure of the liquid, to open the cut 17 or the two cuts 17, so that liquid can pass through the valve body 6 and flow out through the exit channel 7 and the opening 8 thereof. The sealing surface 18 is here spaced apart from the opposite wall section 1 of the outer cap 3, as shown in FIG. 2.

When an excessive pressure P2 is exerted on the contents of the container, as shown in FIG. 3, the valve body 6 is advanced to such an extent that the sealing edge 18 is pressed against the opposite wall section 19, whereby the space between the projection 12 of the valve body 6 and the inner wall of the outlet channel 7 of the outer cap 3 is sealed. In this state no liquid can be dispensed from the container.

After release of the container the valve body 6 will automatically return into the position shown in FIG. 1, in which the cut 17 (cuts 17) is closed and the sealing lip 15 abuts on the conical wall section 9.

Figure 4:
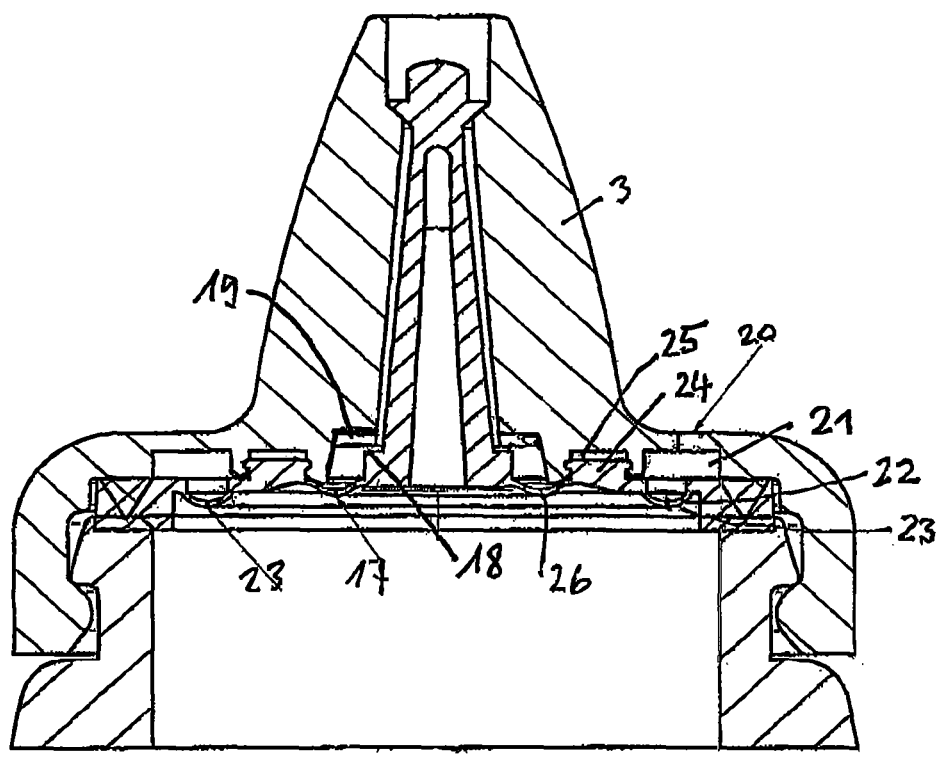
FIG. 4 shows a second embodiment of the invention.

FIG. 4 shows an embodiment of the one-way valve for a simple container into which air enters for pressure compensation after discharge of container liquid. To this end the outer cap 3 includes a vent hole 20 that terminates in an annular air channel 21 that is open downwards, i.e., towards the valve body 6.

Underneath the vent channel 21, the valve body 6 includes an annular, downwardly protruding bulge 22 through the lowermost point of which (viewed in cross section) a cut 23 extends that severs the wall of the valve body 6. Due to this cut 23, and after discharge of container contents, air enters into the interior of the container whereas upon exertion of pressure on the contents of the container for the discharge of liquid the cut 23 remains tightly closed.

An air filter is arranged in the vent channel 21 in the area of the vent hole 20, so that only sterile air passes into the interior of the container.

Radially inside the bulge 22, the valve body 6 includes an upwardly protruding annular projection 24 that locks into a corresponding annular groove 25 of the outer cap 3. This configuration is followed radially inwards by a further curved annular portion 26 of the valve body 6 that, as shown, can either be curved downwardly or may have an opposite curvature. This portion 26 includes the at least one cut 17 through which container liquid can exit upon exertion of pressure on the contents of the container.

The invention claimed is:

1. A one-way valve for discharging a liquid out of a container having a neck, comprising
    an outer cap which is fastened to the container neck and comprises an exit channel for the liquid,
    a valve body of elastic material which is arranged between the container and the outer cap,
    the valve body extending over the opening of the container neck and comprising a projection which projects into the exit channel of the outer cap and is arranged therein to be movable back and forth,
    wherein a space remains between an inner wall of the exit channel and an outer circumference of the projection,
    wherein at least one cut severs a wall of the valve body, through which cut liquid passes into the space of the exit channel upon exertion of pressure on the container;
    wherein a stop defines an advance movement of the projection in a direction of an opening of the exit channel;
    wherein the projection comprises an annular shoulder section on an outer circumference of the projection which is spaced apart from and opposite to a rear edge portion of the exit channel of the outer cap in a pressureless initial state of the valve body; and
    wherein a flow of the liquid to the exit opening of the outer cap is interrupted when the projection is pressed against the stop.

2. The one-way valve according to claim 1, wherein an upper end portion of the projection of the valve body comprises a surrounding sealing lip which in a pressureless initial state of the valve body tightly rests on a wall section of the exit channel.

3. The one-way valve according to claim 1, wherein an end section of the exit channel towards an exit opening widens conically.

4. The one-way valve according to claim 1 wherein the projection of the valve body is made hollow.

5. The one-way valve according to claim 1, wherein the outer cap comprises at least one outer vent hole, and that at least at a place communicating with the vent hole the valve body has at least one further cut through its wall.

6. The one-way valve according to claim 5, wherein the at least one further cut is formed radially outside the at least one cut.

7. The one-way valve according to claim 6, wherein the valve body between the at least one cut and the at least one further cut comprises an annular projection or an annular groove which is in tight engagement with a corresponding groove or projection of the outer cap.

8. The one-way valve according to claim 5, wherein the outer vent hole leads into an annular vent channel which is open towards the inside of the outer cap and which is covered by the at least one further cut.

9. The one-way valve according to claim 8, wherein an air filter is arranged in the vent channel in the area of the vent hole.

10. The one-way valve according to claim 5, wherein the at least one cut or at least one further cut is formed by a knife.

11. The one-way valve according to claim 10, wherein the at least one cut or at least one further cut has the shape of a wedge in cross section.

12. The one-way valve according to claim 1, wherein the valve body is made integral and the outer cap is sealed relative to the edge of the container.

* * * * *